United States Patent [19]

Pepper

[11] Patent Number: 5,046,824
[45] Date of Patent: Sep. 10, 1991

[54] ADAPTIVE OPTICS SYSTEM AND METHOD

[75] Inventor: David M. Pepper, Malibu, Calif.

[73] Assignee: Hughes Aircraft Company, Los Angeles, Calif.

[21] Appl. No.: 308,300

[22] Filed: Feb. 9, 1989

[51] Int. Cl.$^5$ ............................. G02F 1/13; G01J 1/20
[52] U.S. Cl. ................................... 359/72; 250/201.9; 250/229; 359/63; 359/77; 359/78; 359/36
[58] Field of Search .............. 350/330, 335, 342, 345, 350/347 R, 347 E, 353, 354, 359; 250/201, 206, 229; 330/4.3

[56] References Cited

U.S. PATENT DOCUMENTS

| | | | |
|---|---|---|---|
| 3,923,400 | 12/1975 | Hardy | 356/353 |
| 4,309,602 | 1/1982 | Gonsalves et al. | 350/359 X |
| 4,497,544 | 2/1985 | Mitchell et al. | 350/353 |
| 4,546,248 | 10/1985 | Craig | 250/225 |
| 4,556,986 | 12/1985 | Craig | 382/42 |
| 4,762,397 | 8/1988 | Pepper | 350/331 |
| 4,794,296 | 12/1988 | Warde et al. | 330/4.3 X |
| 4,848,877 | 7/1989 | Miller | 350/335 X |
| 4,854,677 | 8/1989 | O'Meara | 350/353 X |

OTHER PUBLICATIONS

C. R. Giuliano, "Applications of Optical Phase Conjugation", Physics Today, Apr. 1981, pp. 27–35.
C. Warde et al, "High Resolution Adaptive Phase Compensation for Low-Visibility Optical Communication", IEEE, 1980, pp. 539–545.
T. R. O'Meara, "Applications of Nonlinear Phase Conjugation in Compensated Active Imaging", Optical Engineering, vol. 21, No. 2, Mar./Apr. 1982, pp. 231–236.
G. D. Craig, "Wide-Brightness-Range Video Camera", NASA Tech Briefs, Fall 1985.
O. V. Garibyan et al., "Optical Phase Conjugation by Microwatt Power of Reference Waves Via Liquid Crystal Light Value", Optics Communication, vol. 38, #1, 1981, pp. 67–70.

Primary Examiner—Linda J. Wallace
Attorney, Agent, or Firm—V. D. Duraiswamy; W. Denson-Low

[57] ABSTRACT

An adaptive optics system and method for providing wavefront aberration compensation with both phase reversal and amplitude preservation. Two operational modes, namely, a transmission mode and a compensated imaging mode, are available. Two spatial light modulators, preferably liquid crystal light valves (LCLVs) are operatively connected in tandem. Each LCLV has an associated feedback loop. One LCLV acts upon the phase aberrations in an input aberrated beam and the other LCLV acts upon the amplitude information in the aberrated beam. Alternative embodiments are also disclosed.

16 Claims, 4 Drawing Sheets

ADAPTIVE OPTICS SYSTEM AND METHOD

This invention was made with U.S. Government support under Contract No. F30602-85-C-0234 awarded by the Department of the Air Force. The U.S. Government has certain rights in this invention.

BACKGROUND OF THE INVENTION

1. Field of the Invention

The present invention relates generally to adaptive optics and active compensated imaging systems. More particularly, the invention relates to adaptive optics and imaging systems for wavefront aberration compensation with both phase reversal and amplitude preservation.

2. Description of the Related Art

Adaptive optics and compensated imaging systems are typically used to correct wavefront aberrations in input laser beams. Typically, the laser beam is transmitted through the atmosphere from a remote source to a receiver or detector. Atmospheric turbulence can severely aberrate the laser beam. Therefore, adaptive optics and compensated imaging systems are used at the receiving site to compensate in real-time for these aberrations and perform wavefront correction or wavefront "scrubbing".

Adaptive optics systems typically employ spatial phase modulators which do not preserve the amplitude information of the incident beam; instead these systems rely primarily on phase reversal or wavefront reversal. The ability of phase conjugators to restore severely aberrated waves to their original unaberrated state after passage through the aberration-producing medium twice, and the application of phase conjugators to adaptive optics systems is well known. See for example, the discussion by C. R. Giuliano in "Applications of Optical Phase Conjugation", Physics Today, April 1981, pp. 1-8. However, the conventional approach to wavefront correction of laser beams does not compensate for amplitude variations, but only compensates for phase variations (see page 5 of the Giuliano article referred to above). This is a drawback with conventional adaptive optics systems such as the deformable mirror arrangement. Moreover, it has been theoretically shown that only if an aberrated input beam is corrected to have both wavefront reversal and amplitude preservation can it perfectly compensate for phase distortions as it propagates back through the aberrating medium. Therefore, perfect compensation is not achieved when only the phase of the aberrated beam is reversed.

It has been suggested that the presence of amplitude variations, due to atmospheric scintillation and device inhomogeneties, may seriously degrade the performance of adaptive optics systems in certain operational modes. For example, in a liquid crystal light valve (LCLV) adaptive optics system, although small amplitude variations may not degrade performance significantly, very large amplitude fluctuations may be problematic. An adaptive optics system for phase compensation is described by Cardinal Warde et al. in "High Resolution Adaptive Phase Compensation for Low-Visibility Optical Communication",Proc. IEEE, Vol. 68, pp. 539-545 (1980).

Although nonlinear optical approaches to adaptive optics applications, such as Stimulated Brillouin scattering, stimulated Raman scattering, four-wave mixing, and two-wave mixing, are able to perform aberration compensation even if the reference wave has substantial amplitude variation over the wavefront, these approaches suffer from various drawbacks. For example, the nonlinear approach generally requires the reference wavelength to meet specific requirements depending on the amplification process and the conjugation process. Also, nonlinear optical approaches are generally unsatisfactory in low-irradiance environments.

The loss of spatial amplitude information is particularly pronounced and problematic in the far-field of free-space or guided-wave structures, and in multimode fiber optic transmission systems.

Therefore, there is a need for an adaptive optics system which provides amplitude preservation in addition to phase aberration compensation with high spatial bandwidth. Such a system will be able to preserve or restore phase and amplitude information in an input aberrated beam even in low irradiance environments.

SUMMARY OF THE INVENTION

A feature of the present invention is to provide an adaptive optics system and method for providing both phase reversal and amplitude preservation. In accordance with the invention, at least one phase-correcting spatial light modulator (SLM) and at least one amplitude-preserving SLM are provided. These two SLMs are operatively connected in tandem fashion so that the output of one SLM is provided as input to the second SLM. One SLM handles aberrations of a first type (phase or amplitude) and the other SLM handles aberrations of a second type (amplitude or phase). Thus, the beam output from the second SLM is provided with compensation for both types of aberrations.

This adaptive optics system provides at least a first spatial light modulator (SLM) capable of effecting aberration correction of a first type in an input aberrated beam and providing a first reflected beam in response thereto. A first error means provides a first error signal indicative of the aberrations of the first type in said aberrated beam to the first SLM. Then, the first SLM compensates for the aberrations of the first type in the aberrated beam in response to the first error signal by inducing conjugate aberrations, in the first reflected beam. A second SLM, capable of effecting aberration correction of a second type is operatively connected to the first SLM. This second SLM receives the first reflected beam and provides a second reflected beam in response thereto. A second error means provides a second error signal, indicative of the aberrations of the second type in the aberrated beam, to the second SLM. The second SLM compensates for the aberrations of the second type in response thereto by inducing conjugate aberrations of the second type in the second reflected beam.

The present invention can be operated in two modes of operation, namely, a transmission mode and a compensated imaging mode for extended objects.

In accordance with another embodiment of the invention, the aberrated beam is provided first to an amplitude-preserving SLM and the resultant reflected beam which has been compensated for amplitude variations is then provided to a phase-correcting SLM.

A compensated imaging system in accordance with the invention compensates for both the phase and amplitude propagation distortions experienced by a beam reflected from a dominant glint on an extended remote object.

In one preferred embodiment of the invention, the first SLM is a phase-correcting SLM and the second SLM is an amplitude-preserving SLM.

Additional features and advantages of the invention will become apparent to those skilled in the art from the following detailed description of the invention, taken together with the accompanying drawings, in which:

DETAILED DESCRIPTION OF THE INVENTION

The basic components of an adaptive optics system in accordance with the invention are a first spatial light modulator (SLM) which is operatively connected in tandem or cascaded fashion to a second SLM. One of the two SLMs is an amplitude-preserving SLM and the other is a phase correcting SLM. The SLMs can be of any suitable type such as microchannel SLMs, magneto-optical SLMs, multiple quantum well SLMs or liquid crystal light valves (LCLVs). In a presently preferred embodiment, the two SLMs are liquid crystal light valves (LCLVs).

It is contemplated that the present invention can be operated in two modes of operation, namely, a transmission mode and a compensated imaging mode for extended objects.

Figure 1:
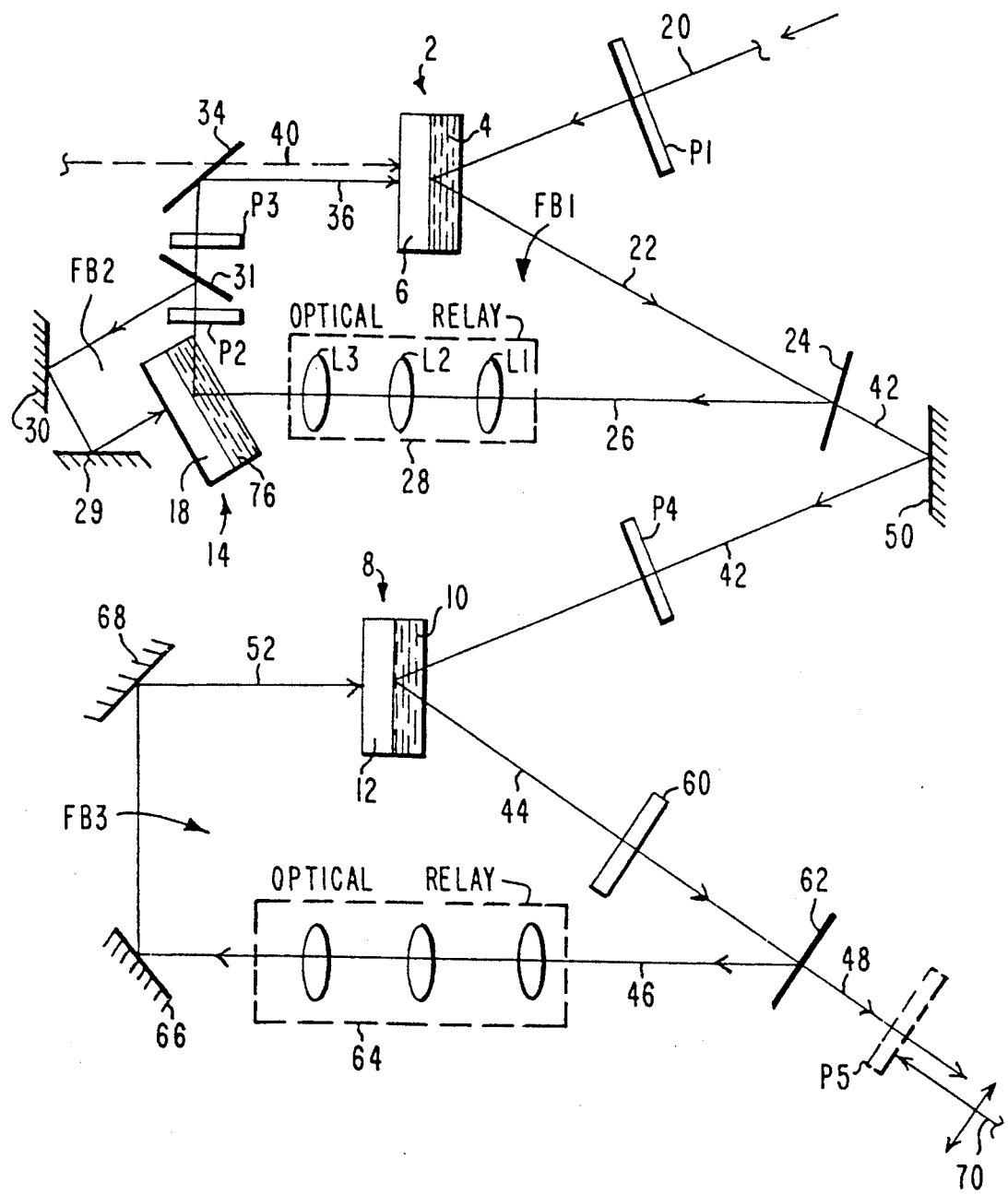
FIG. 1 is an illustrative diagram of a transmission-mode adaptive optics system in accordance with the present invention.

The transmission mode of operation is illustrated in FIG. 1. A beam 20 from a remote source becomes aberrated as it propagates through the typically turbulent atmosphere. This aberrated beam 20 which has both amplitude and phase aberrations, passes through polarizer P1 and is incident on the phase-correcting LCLV 2.

One type of phase-correcting LCLV suitable for use in the present invention is the LCLV described in patent application, Ser. No. 865,224, filed May 20, 1986 for "Method For Improving the Spatial Resolution In An Integrated Adaptive Optics System", assigned to Hughes Aircraft Company the assignee of the present invention. This type of phase-correcting LCLV 2 includes a liquid crystal (LC) layer 4 and a photoconductive substrate (PC) layer 6. The LC layer 4 can have liquid crystal molecules with parallel or perpendicular alignment. However, a parallel aligned LC layer is preferred because it provides higher birefringence than the perpendicularly-aligned layer, and the magnitude of resultant phase shifting is proportional to the bire-fringence of the LC layer.

Beam 20 passes through liquid crystal (LC) layer 4, and is reflected at the mirror interface between the photoconductive substrate (PC) 6 and LC 4 as a first reflected beam 22. A portion 26 of this first reflected beam is fed back through a suitable feedback loop (FB1) to the PC 6 side of LCLV 2.

The feedback loop (FB1) associated with LCLV 2 includes an LCLV 14 and conventional components such as lenses (L1, L2 and L3), mirrors (29 and 30), a beam-splitter (or a mirror) 34 and polarizers (P2 and P3). LCLV 14 also has an associated feedback loop (FB2) with beamsplitter 31, and components such as lenses (not shown) and mirrors 29 and 30. LCLV 14 is an amplitude SLM for "clipping" the intensity peaks in the intensity distribution of beam 26, without modifying the phase-front. LCLV 14 functions as an "amplitude scrubber" by removing the intensity peaks in beam 26 so that the portion of the beam 26 which is fed-back to PC 6 has uniform intensity. This improves the performance of LCLV 2, since the interference pattern activating PC 6 will then be truly indicative of only the phase aberrations in the fed-back portion, the amplitude fluctuations having been intentionally scrubbed or clipped. The fed-back portion is combined with a monochromatic plane-wave local reference beam 40 generated by a local reference source 38 (not shown in FIG. 1). The interference pattern so generated is incident on PC 6. The intensity variations in this interference pattern (hereinafter referred to as the error signal) are indicative of the phase aberrations in the first reflected beam. As in conventional LCLV operation, a voltage is applied across LCLV 2. A spatial variation in impedance results in the PC 6 layer due to the incident interference pattern. This spatial variation in turn causes a corresponding spatial voltage variation in LC 4, and proportionate rotation of the LC molecules therein. It is to be noted that LCLV 2 does not replicate the amplitude variations of the input aberrated beam and therefore only partial aberration compensation is achieved. Only the phase aberrations in the aberrated beam are compensated or cancelled out by the conjugate phase aberrations induced therein by LCLV 2. Consequently, the steady state emergent reflected beam 42 will be virtually free of phase aberrations but may contain amplitude (or intensity) variations transversely across the beam. The emergent reflected beam 42 is reflected by mirror 50, passed through polarizer P4 and fed to an amplitude-preserving LCLV 8. A voltage is applied across LCLV 8 in the conventional manner. Beam 42 passes through LC 10 and is reflected at the PC 12-LC 10 interface. Reflected beam 44 passes through a polarizer 60 and is split by beam splitter 62. A portion 46 of beam 44 is fed back as beam 52 to the PC 12 side of LCLV 8 through a feedback loop (FB3) with an optical relay 64 using conventional components such as lenses, and mirrors 66 and 68. Unlike the phase correcting LCLV 2, the fed-back beam 52 is not combined with a local reference signal in the feed-back loop associated with it. The fed-back portion 52 spatially modifies the voltage drop across the PC 12 and thereby suitably modifies the LC layer 10. After a steady state is reached, LC 10 is modified to impress the amplitude information of the aberrated beam 20 on a subsequently incident plane wave readout beam.

Alternatively, instead of feeding back a portion of beam 44 to PC 12, a "leaky" mirror may be interposed between PC 12 and LC 10. In the conventional sense, a "leaky" mirror is partially transmissive. Therefore, part of the beam 42 which is incident on the mirror, will "leak" through the mirror and activate PC 12. Amplitude-preserving LCLV 8 includes a LC layer 10 and a photoconductive substrate (PC) 12. It is preferred that the LC layer 10 be composed of 45° twisted nematic or birefringent liquid crystal material. A phase-correcting LCLV, oriented at 45° to crossed polarizers (not shown in FIG. 1) can also be used. The LC layer 10 in such a case can have parallel or perpendicularly aligned liquid crystal molecules. For the amplitude-preserving LCLV 8, if birefringent LC is used, a perpendicularly aligned LC layer is preferred.

LCLV 14, which is used in the feedback loop FB1 of the phase-correcting LCLV 2, is also an amplitude SLM like LCLV 8, and the preferred characteristics (45° twisted nematic or birefringent liquid crystal) are similar. However, the preferred mode of operation is different, as hereinbelow discussed.

Figure 2:
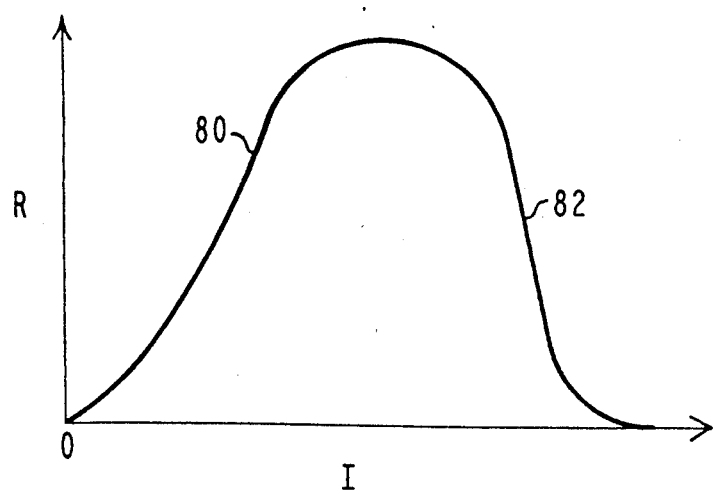
FIG. 2 is a reflection characteristic curve for a typical LCLV operated in an amplitude SLM mode.

LCLV 14 essentially functions as an amplitude "scrubber". Therefore, LCLV 14 is preferably operated in a "backslope mode". In the "backslope" mode of operation, the LCLV is operated with applied bias voltages or threshold optical intensity of magnitude such that the reflectivity of the LCLV decreases as the intensity of the input beam increases as shown in portion 82 of the reflection characteristic curve of FIG. 2. However, LCLV 8 is preferably operated in a "frontslope" mode. For "frontslope" operation, the LCLV is operated with applied bias voltages or or threshold optical intensity of magnitude such that the reflectivity of the LCLV increases as the intensity of the input beam increases. This corresponds to portion 80 of the reflection characteristic curve of FIG. 2.

Like LCLV 8, LCLV 14 can have a "leaky mirror".

In the above-described transmission mode of operation, the LC layers in the two LCLVs 2 and 8 are modified by the above-described sequence of steps as the aberrated beam 20 is processed. When subsequently readout with a beam 70 which has a planar phasefront and uniform intensity, the LCLVs 2 and 8 modify the readout beam 70 in such a manner as to impress upon it the amplitude information and the phase conjugate of the phase aberrations of the aberrated beam 20. In this mode of operation, the steady-state emergent beam 48 is itself not used for any purpose.

Figure 3:
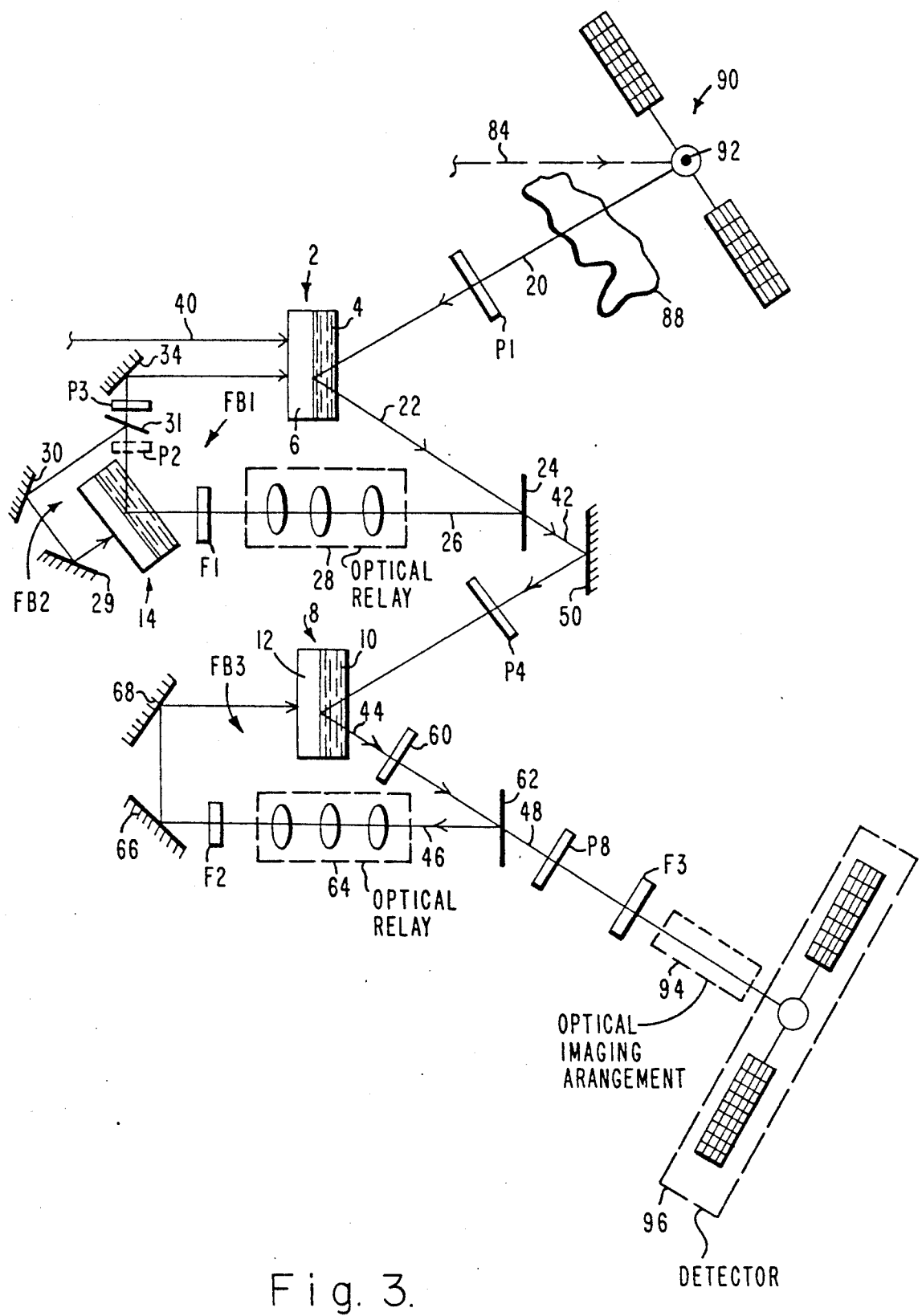
FIG. 3 is an illustrative diagram of a compensated imaging system in accordance with the present invention.

An improved compensated imaging system (CIS) in accordance with the present invention is shown in FIG. 3. An extended remote object 90 has a dominant "glint" or highly reflective diffraction-limited area 92. When this glint 92 is illuminated, either by a nearby reference beam or a remote reference beam 84, having a wavelength $\lambda_{ref}$, the return beam 20 reflected by glint 92 is distinguishable from the beam reflected by the rest of the object 90. The return beam 20 from the glint can be distinguished from the other beams using polarization measurement, wavelength measurement or temporal demultiplexing techniques as is known in the art. The glint illumination $\lambda_{ref}$ can also be obtained from a cooperative reference source in the neighborhood of the extended object. (See, for example, the article by T. R. O'Meara, "Applications of Nonlinear Phase Conjugation in Compensated Active Imaging", *Optical Engineering*, Vol. 21 (2), Mar. 1982, pp. 231-236.) The feedback loops of the two LCLVs 2 and 8 are configured, as known in the art, to operate only on the glint return 20. After steady-state convergence of the two LCLVs, the system compensates for both the phase and amplitude propagation distortions sampled by the glint return beam during propagation through the aberration-producing atmosphere 88. To the extent that the beams reflected by the glint and the extended object experience the same path distortions, the compensated image of the extended object generated at the output 96 will be diffraction-limited and free of distortions induced during propagation.

In the preferred embodiment illustrated in FIG. 3, the glint return 20 passes through a polarizer P1 and is incident first on the phase-correcting LCLV 2. A portion 26 of the beam 22 reflected at PC 6-LC 4 mirror interface is fed back to PC 6 via feedback loop FB1. The characteristics of LCLV 2 are generally as discussed earlier in conjunction with FIG. 1. It is preferred that liquid crystal layer LC 4 be parallel-aligned. The purpose of LCLV 2 is to invert the wavefront of the incident beam 20.

The feedback loop FB1 associated with LCLV 2 is with one exception, substantially similar to the FB1 loop described earlier in conjunction with FIG. 1. The exception is that a filter F1 is included in the loop to transmit the wavelength, $\lambda_{ref}$ of the glint-reflected reference beam and block the wavelengths $\lambda_{obj}$ associated with the reflected returns from the rest of the extended object 90. Alternately, beam-splitter 24 can be a dichroic element to reflect $\lambda_{ref}$ and to transmit $\lambda_{obj}$.

The fed back portion is combined with a local plane wave reference beam 40 of wavelength $\lambda_{ref}$. The resulting interference pattern is incident on PC 6 and accordingly modifies LC layer 4. The steady-state, convergent, reflected beam 42 is fed-forward via beam-splitter 24, mirror 50 and polarizer P4 to amplitude-preserving LCLV 8.

LCLV 8 is preferably operated in a backslope mode to "clip" or homogenize the intensity of the incident beam. LCLV 8 operates only on the glint return beam via feedback loop FB3 to modify the LC layer 10. Note that if a "leaky" mirror LCLV is used as LCLV 8, its internal mirror must be designed to partially transmit (or "leak") only $\lambda_{ref}$ while totally reflecting $\lambda_{obj}$. The LC layer 10 is thereby adapted to thereafter "clip" the intensity of the entire input aberrated beam from extended remote object 90, provided only that the return beams reflected from the glint and the extended object experience the same atmosphere-produced aberrations. Thus, the atmospherically induced amplitude aberrations are compensated-for, the intensity peaks are clipped and a more accurate image of the object is obtained.

The feedback loop FB3 associated with LCLV 8, with one exception, is substantially identical to the loop described in conjunction with FIG. 1. The exception is the filter F2 included in the loop to transmit only wavelength $\lambda_{ref}$ and block wavelengths $\lambda_{obj}$. The steady-state fed-forward beam 48 passes through polarizer P8, filter F3, optical imaging system 94 and is conveyed to output detector 96. Alternatively, beamsplitter 62 can be a dichroic element to reflect $\lambda_{ref}$ and to transmit $\lambda_{obj}$. Polarizers P8 and 60 are crossed with respect to polarizers P1 and P4. Polarizers P1 and P4 are parallel with respect to each other. Filter F3 transmits $\lambda_{obj}$ and blocks $\lambda_{ref}$ wavelengths. The optical imaging arrangement 94 can be of any suitable type such as a telescope system with lenses. The detector 96 can be of any suitable type such as an intensifier with image display screen, array, or vidicon.

After steady-state is reached, the output image received by detector 96 is the image of extended object 90 with compensation for the aberrations produced by the intervening atmosphere.

Figure 4:
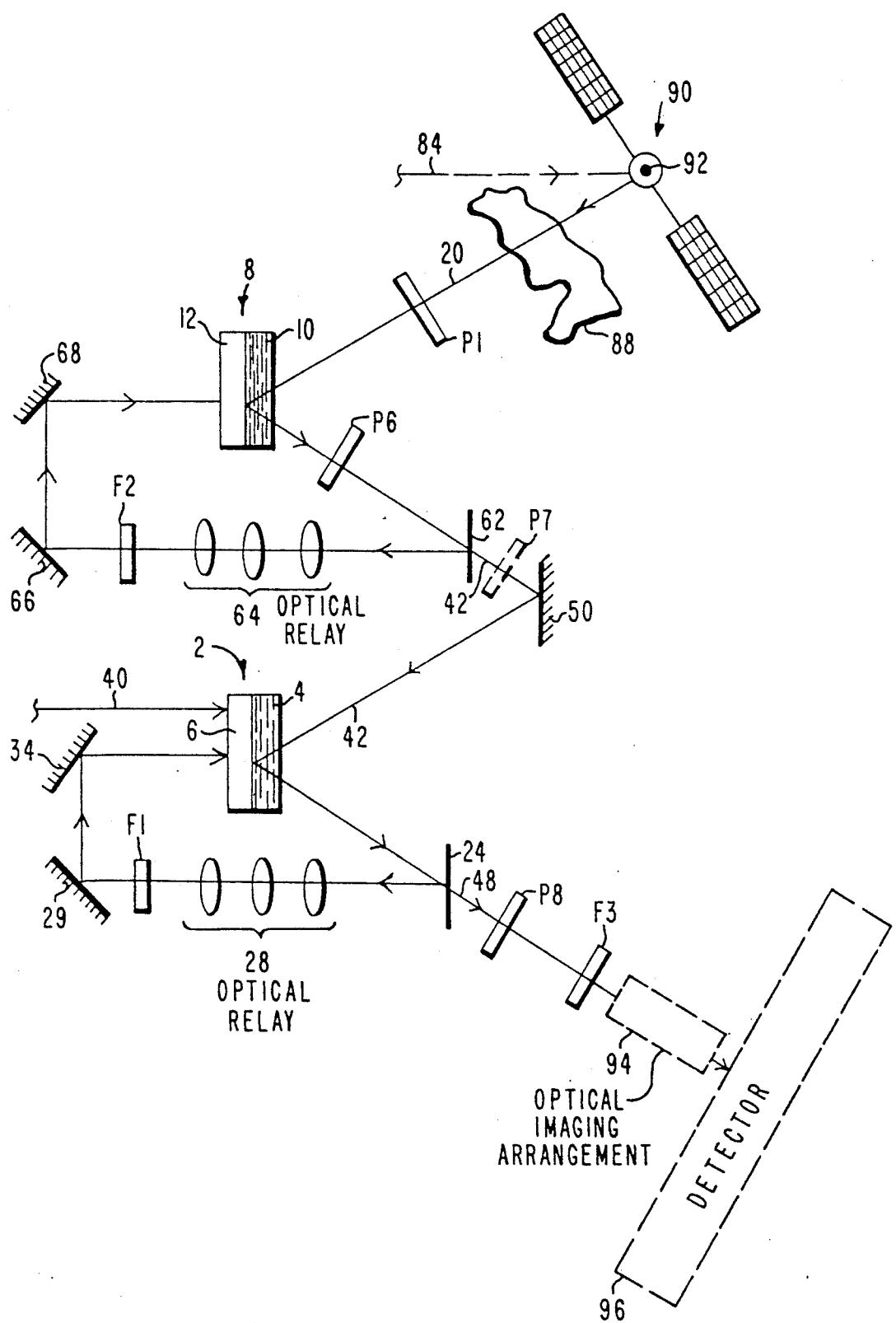
FIG. 4 is an illustrative diagram of an alternative embodiment of the compensated imaging system in accordance with the present invention.

An alternative, less preferred, compensated imaging system in accordance with the present invention is illustrated in FIG. 4. The glint return 20 passes through a polarizer P1 and is incident first on the amplitude LCLV 8. LCLV 8 is preferably operated in a backslope mode to "clip" or homogenize the intensity of the incident beam, so that the beam 42 which is fed-forward to LCLV 2 has uniform intensity regardless of the variation in intensity of the input aberrated beam.

LCLV 8 operates only on the glint return beam via feedback loop FB3 to modify the LC layer 10. The LC layer is thereby adapted to thereafter preserve the amplitude information of the entire input aberrated beam from extended remote object 90, by compensating for the aberrations induced therein by the atmosphere. The operation of the feedback loop FB3 associated with LCLV 8 is substantially identical to the loop described in conjunction with FIG. 1. However, a filter F1 is included in this loop to block wavelengths $\lambda_{obj}$ associated with the reflected returns from the extended object 90 which do not correspond to the wavelength $\lambda_{ref}$ of the glint-returned reference illumination. Thus, filter F1 transmits only $\lambda_{ref}$. Polarizers P6 and P7 are respectively associated with the feedback loop and the forward-going beam 42. Polarizer P1 is crossed with respect to polarizers P6 and P7 to support the clipping function of LCLV 8. The forward-going beam 42 is then incident on the phase-correcting LCLV 2.

In this operational mode, phase-correcting LCLV 2 is used to invert the wavefront of the incident beam, and preferably has a parallel-aligned liquid crystal layer.

The feedback loop FB1 associated with LCLV 2 is, with one exception, substantially similar to the FB1 loop described earlier in conjunction with FIG. 1. The one exception is that a filter F2 is included in the loop to transmit wavelength $\lambda_{ref}$ and block $\lambda_{obj}$.

The forward-going beam 48 passes through a polarizer P8, filter F3 and an optical imaging arrangement 94, and the output is conveyed to a detector 96. Optical imaging arrangement 94 can be any suitable conventional imaging arrangement such as a telescope arrangement with lenses. The output received at detector 96 is an image of the extended object 90 free of distortions produced by the atmosphere. Detector 96 can be of any suitable type such as an intensifier-display screen, detector array, or vidicon.

Figure 5:
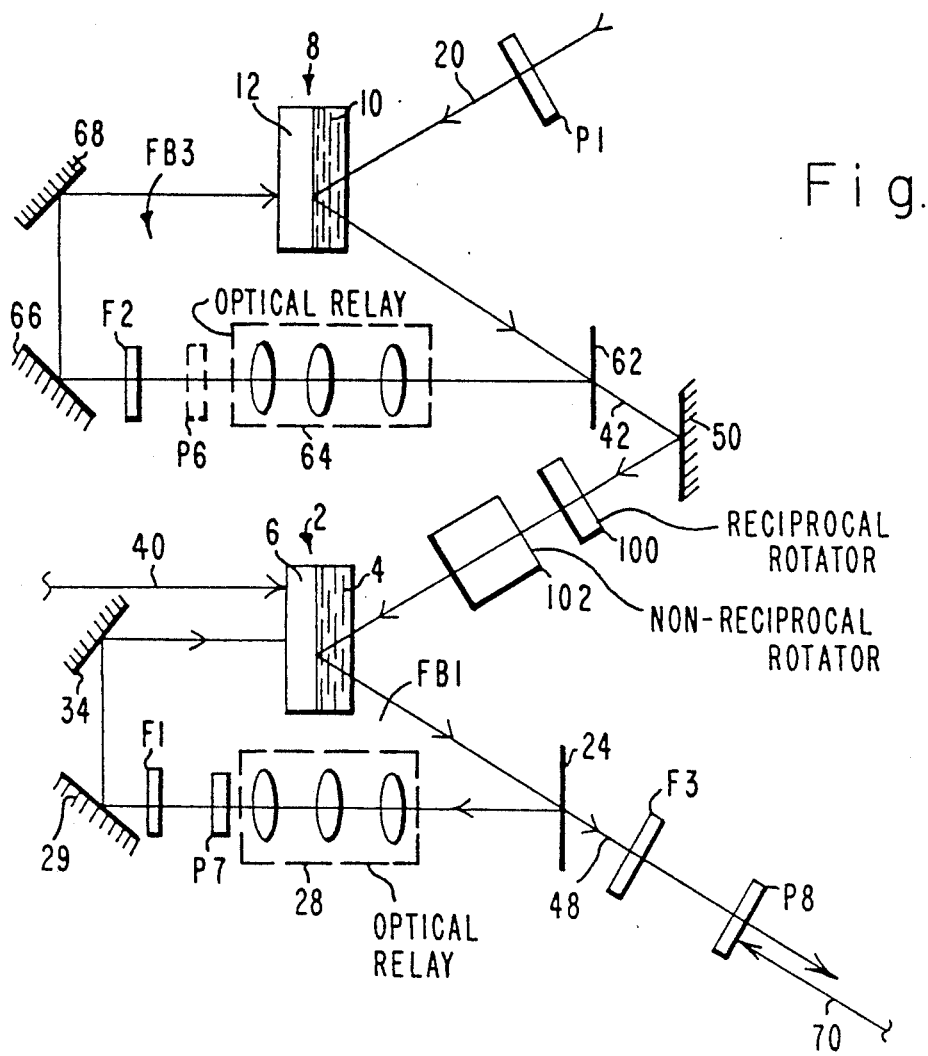
FIG. 5 is an illustrative diagram of a dual-mode transmission/compensated imaging system in accordance with the present invention.

Another embodiment of the present invention is illustrated in FIG. 5. The embodiment of FIG. 5 is a dual-mode system combining the functions of the compensated imaging system (CIS) of FIG. 4 and the transmission mode system of FIG. 1 in one compact system.

In this embodiment, the aberrated input beam is incident first on the amplitude-preserving LCLV 8 after passing a polarizer P1.

The feedback loop FB3 associated with LCLV 8 is generally similar to the loop described in connection with FIG. 4. LCLV 8 is operated in a back-slope mode. Filter F2 transmits $\lambda_{ref}$ and blocks $\lambda_{obj}$. Polarizer P6 is used for feedback only. It is not used for feed forward, steady-state operation. Polarizers P1 and P6 are crossed polarizers.

A 45° reciprocal rotator 100, such as a prism waveplate, or other train of passive optical components, and a 45° non-reciprocal rotator 102 such as a Faraday rotator are used in the forward path of steady-state reflected beam 42. Together, components 100 and 102 provide a 0°/90° linear polarization rotation combination. The polarization state of the forward-going beam 42 is unaffected by this polarization rotation combination. However, the polarization state of the plane wave readout beam 70, traveling in the opposite direction, is rotated by 90° by this combination. Readout beam 70 has uniform phase front and intensity distribution. Thus, LCLV 8 can be used both in the compensated imaging mode to make the intensity of the fed forward beam uniform and in the transmission mode, to preserve the amplitude information of the input aberrated beam and replicate this information in the plane-wave readout beam.

The compensated imaging mode is hereinbelow described. After passing through components 100 and 102, the steady-state forward-going beam 42 is reflected by phase-correcting LCLV 2. The operation and configuration of the feedback loop FB1 associated with LCLV 2 is basically similar to the loop discussed earlier in conjunction with FIG. 4. However, polarizer P7 is used as a feedback polarizer in the feedback loop, and is crossed with respect to P1. LCLV 2, in conjunction with elements P7, 100 and 102, clips the intensity peaks in the fedback beam which is incident on PC6 of LCLV 2. The intensity having been clipped, only phase information is present in this fedback beam. Therefore, the error signal resulting from the interference with the local reference beam 40 is truly indicative of only the phase aberrations in the input beam. After steady-state convergence, emergent forward-going reflected beam 48 passes through filter F3 and polarizer P8 and emerges free of phase distortions, resulting in an image of the extended object with high optical quality and fidelity.

In the read-out transmission mode, a plane wavefront read-out beam 70 thereafter reads out the two LCLVs 2 and 8, traveling in a direction opposite to the aberrated beam 20. The amplitude information and conjugate of the phase aberrations of the aberrated beam 20 are impressed on this read-out beam. For this operation mode, filter F3, which transmits $\lambda_{obj}$ and blocks $\lambda_{ref}$, is removed. This can be achieved using conventional electro-optical techniques. For example, beam steering elements can be used to direct the beam around the filter, or an electro-optically controllable filter whose bandpass can be suitably modified can be used.

In view of the above teachings and detailed descriptions of particular illustrative embodiments, persons of ordinary skill in the art will readily appreciate that many modifications and variations of the present invention are possible and contemplated. Accordingly, the present invention may be practiced otherwise than as specifically described above, without departing from the nature and scope of the invention as set forth in the appended claims.

What is claimed is:
1. An adaptive optics system comprising:
at least a first spatial light modulator capable of effecting aberration correction of a first type to receive an aberrated beam having aberrations of first and second types and reflect a first reflected beam;
first means for feeding back to said first spatial light modulator a portion derived from said first reflected beam and indicative of the aberrations of the first type in said aberrated beam, said first spatial light modulator thereafter acting upon the aberrations of the first type in said aberrated beam in response thereto to generate a beam having partial aberration compensation;
at least a second spatial light modulator, capable of effecting aberration correction of a second type to receive said beam having partial aberration compensation from said first spatial light modulator and provide a second reflected beam in response thereto; and second means for feeding back to said second spatial light modulator, a portion derived from said second reflected beam and indicative of the aberrations of the second type in said aberrated beam, said second spatial light modulator acting upon the aberrations of the second type in the beam having partial aberration compensation in response thereto.

2. The system of claim 1 wherein said first spatial light modulator is a phase-correcting spatial light modulator and said second spatial light modulator is an amplitude-preserving spatial light modulator.

3. The system of claim 2 wherein said phase-correcting spatial light modulator is a phase-correcting liquid crystal light valve and said amplitude-preserving spatial light modulator is an amplitude-preserving liquid crystal light valve.

4. The system of claim 3 wherein said phase correcting liquid crystal light valve comprises parallel-aligned liquid crystal material.

5. The system of claim 3 wherein said phase-correcting liquid crystal light valve comprises perpendicularly aligned liquid crystal material.

6. The system of claim 3 wherein said amplitude preserving liquid crystal light valve comprises twisted nematic liquid crystal material.

7. The system of claim 3 wherein said amplitude-preserving liquid crystal light valve comprises perpendicularly aligned nematic liquid crystal material and said second means includes crossed polarizers.

8. The system of claim 3 wherein said first mean includes a local reference generator for generating a plane-wave local reference beam for combining with said portion derived from said first reflected beam.

9. The system of claim 8 wherein said first means further includes an amplitude-preserving spatial light modulator.

10. An adaptive optics system comprising:
at least one phase-correcting LCLV having a parallel-aligned liquid crystal layer, a reflective layer adjacent to said liquid crystal layer, and a photoconductive substrate adjacent to said reflective layer, said phase-correcting LCLV being disposed to receive an aberrated beam and operative to provide a first reflected beam in response thereto;
optical relay means for relaying a first error signal indicative of the phase aberrations in said aberrated beam to said photoconductive substrate, said first error signal being formed from a first aberrated portion of said first reflected beam and a local plane wave reference beam, said liquid crystal layer being modified, in response to said first error signal, to induce conjugate phase aberrations in said first reflected beam to effect phase aberration compensation therein and to provide a phase-aberration-compensated first reflected beam;
at least one amplitude-preserving LCLV, operatively connected to said phase-correcting LCLV for receiving said phase-aberration-compensated first reflected beam, and for providing a second reflected beam in response thereto; and
second optical relay means for relaying to said amplitude-preserving LCLV, a second error signal indicative of the amplitude aberrations in said second reflected beam, said second error signal being formed from a first portion of said second reflected beam, said LCLV being modified, in response to said second error signal, to induce conjugate amplitude aberrations in said second reflected beam in order to effect amplitude compensation therein.

11. The system of claim 10 wherein said amplitude-preserving LCLV comprises:
a twisted nematic liquid crystal layer, a reflective layer adjacent to said twisted nematic liquid crytal layer, and a photoconductive substrate adjacent to said reflective layer.

12. The system of claim 11 wherein said reflective layer is a leaky mirror.

13. The system of claim 10 wherein said amplitude-preserving LCLV comprises perpendicularly aligned liquid crystal material and said second means for relaying includes crossed polarizers.

14. A method of wavefront correction of an aberrated beam, comprising the steps of:
reflecting the aberrated beam using a phase-correcting LCLV to provide a first reflected aberrated beam;
repeatedly providing a portion of said first reflected aberrated beam to said phase-correcting LCLV after combining said portion with a local plane wave reference to adapt said phase-correcting LCLV to provide phase compensation in said first reflected aberrated beam and generate a phase compensated beam;
providing said phase compensated beam to an amplitude-preserving LCLV to generate a second reflected beam;
repeatedly providing a portion of said second reflected beam to said amplitude-preserving LCLV to adapt said amplitude-preserving LCLV to provide amplitude compensation for said phase compensated beam.

15. The method of claim 14 wherein:
the aberrated beam is reflected from an extended remote object with a glint and said extended remote object is imaged at an output;
the step of repeatedly providing a first portion of said first reflected beam further includes filtering to transmit a wavelength associated with a glint-reflected portion;
the step of repeatedly providing a first portion of said second reflected beam further includes filtering to transmit only the wavelength associated with the glint-reflected portion; and
the method further includes the step of providing a steady-state fed-forward beam to an imaging output means through means which transmit wavelengths associated with the extended remote object and block the wavelength associated with the glint-reflected portion.

16. The method of claim 14 wherein said amplitude-correcting LCLV and phase-correcting LCLV are subsequently read-out with a readout beam having a planar phase front and uniform intensity to impress the amplitude information and phase conjugate of the phase aberrations of said aberrated beam upon said readout beam.

* * * * *